United States Patent
Hoffmann

(10) Patent No.: US 7,248,576 B2
(45) Date of Patent: Jul. 24, 2007

(54) SERVICE CONTROL FOR INTELLIGENT NETWORKS FOR PACKET NETWORK CONNECTIONS

(75) Inventor: Klaus Hoffmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 960 days.

(21) Appl. No.: 10/253,902

(22) Filed: Jan. 21, 2003

(65) Prior Publication Data
US 2003/0086414 A1 May 8, 2003

(30) Foreign Application Priority Data
Sep. 26, 2001 (DE) ................. 101 47 494

(51) Int. Cl.
H04L 12/66 (2006.01)
H04L 12/28 (2006.01)

(52) U.S. Cl. .............. 370/352; 370/410; 370/467

(58) Field of Classification Search ............. 370/522, 370/236, 467, 352, 353, 355, 356, 357, 435, 370/386, 395.1, 401, 410; 379/221.08, 221.09, 379/221.1, 221.11, 221.12
See application file for complete search history.

(56) References Cited

U.S. PATENT DOCUMENTS

| | | | |
|---|---|---|---|
| 5,953,404 A | | 9/1999 | Fikis et al. |
| 6,160,882 A | * | 12/2000 | Weik et al. ............ 379/220.01 |
| 6,317,428 B1 | * | 11/2001 | Mercouroff et al. ........ 370/360 |
| 6,335,968 B1 | * | 1/2002 | Malik ..................... 379/114.2 |
| 6,452,928 B1 | * | 9/2002 | Christie .................. 370/395.3 |
| 6,480,493 B1 | * | 11/2002 | Christie et al. .......... 370/395.2 |
| 6,757,285 B1 | * | 6/2004 | Lakhani et al. .......... 370/395.2 |
| 6,769,026 B1 | * | 7/2004 | Casile et al. ................. 709/227 |
| 6,856,676 B1 | * | 2/2005 | Pirot et al. ............. 379/201.01 |
| 6,965,592 B2 | * | 11/2005 | Tinsley et al. .............. 370/352 |
| 6,990,124 B1 | * | 1/2006 | Dalias et al. ............... 370/522 |
| 6,996,224 B2 | * | 2/2006 | Dasgupta et al. ...... 379/221.08 |
| 7,085,362 B1 | * | 8/2006 | Christie et al. ............. 379/200 |
| 2002/0191770 A1 | * | 12/2002 | Dasgupta et al. ...... 379/221.08 |

FOREIGN PATENT DOCUMENTS

EP 1 026 903 A 8/2000

* cited by examiner

Primary Examiner—Chau Nguyen
Assistant Examiner—Hicham Foud
(74) Attorney, Agent, or Firm—Bell, Boyd & Lloyd LLP

(57) ABSTRACT

The invention relates to a system and method for changing protocol parameters of a signaling protocol for the implementation of services in an Intelligent Network concept with user data transfer via a packet network. Resources are provided in a service control point for parameter changes to be made in the context of the services to the signaling protocol used. Implementation of a service, which requires a change to a protocol parameter in the signaling protocol, correspondingly adapted intelligent network application part procedures are used by a service switching point to trigger the parameter changes to be made in an service control point and the change to the protocol parameter is effected by the service control point in the service switching point. The invention has the advantage that it allows parameter changes, which are not provided in the ISDN user part because of their relationship with the packet network.

12 Claims, 1 Drawing Sheet

SERVICE CONTROL FOR INTELLIGENT NETWORKS FOR PACKET NETWORK CONNECTIONS

CLAIM FOR PRIORITY

This application claims priority to German Application No. 10147494.6 which was filed in the German language on Sep. 26, 2001.

TECHNICAL FIELD OF THE INVENTION

The invention relates to a system and method for changing protocol parameters of a signaling protocol for the implementation of services in the context of the IN (intelligent network) concept with user data transfer via a packet network.

BACKGROUND OF THE INVENTION

The concept of the "intelligent network" (IN) was developed for efficient deployment of resources when using digital communication networks. This is a structural concept for flexible service control and service development through the use of software and functionality implemented therewith. Internationally IN is defined in the Q.1200 series recommendations, for which the ITU (International Telecommunications Union) is responsible. The basic thinking behind IN is the separation of switching functions and service functions, i.e. resources for connection set-up are no longer located wholly in the individual switching point but are centralized. The advantage of this concept is simpler management and adaptation of these centralized resources. For example, when new services are introduced, not all switching points have to be adapted individually.

There are three hierarchical levels in the IN architecture, management level, service control level, and switching and transport level. The switching points—generally referred to as SSP (service switching point)—of the lowest level, i.e. the switching and transport level, are controlled by control points—generally referred to as SCP (service control point)—at service control level for the implementation of services and where appropriate are supplied with data from centralized databases. SSP and SCP are defined as physical entities for the IN concept in Q.1205.

General aspects of an INAP (intelligent network application protocol) protocol are described in Q.1208 for IN applications. At present INAP protocols with CS2 (capability set 2) and CS3 (capability set 3) operational features in accordance with the ITU recommendations numbered Q.122x and Q.123x are frequently used for IN applications.

Further specifications are required to provide telecommunication services and service features in the context of the IN concept. For example, for ISDN (integrated services digital network) applications signaling functions are standardized in the context of the ISUP (ISDN user part) in ITU documents Q.761-Q.764 and Q.766, with the ISUP representing a protocol based on signaling system no. 7 (SS#7), which allows separation of the transfer of user data and control data and which is standardized by the ITU in the Q.700 series. For ISDN applications in the context of the IN concept the ITU has produced standards Q.1600 and Q.1601 which govern the interaction of ISUP and INAP CS1 or INAP CS2.

Given the increasing importance of the transfer of user data and any signaling data via different networks or carriers, as is frequently the case, for example, with IP based applications, signaling protocols are being developed, which allow a specific set of services and service features, regardless of the carrier. An important example of such a service is internet telephony (VoIP), in which connection-based voice transfer is to be achieved via different physical networks. The ITU draft of Q.1901 describes a signaling protocol, the BICC (bearer independent call control) protocol, with which the services and service features defined for the ISDN network—hereafter referred to as ISDN services or service features—are to be implemented, regardless of the carrier. The BICC protocol is based on the ISUP protocol. As described in the draft of Q.765.5, the transport mechanism (application transport mechanism) set out in Q.765 can be used for the transport of carrier-related data using the BICC protocol.

When implementing ISDN services and service features in the context of the IN concept with user data transfer via a packet network using a carrier-independent signaling protocol, such as, for example, BICC CS2, there is the problem that the parameter changes necessary or desirable for this are not supported.

SUMMARY OF THE INVENTION

The invention relates to protocol software for efficient use of hardware resources and software resources, which are deployed, for example, in switching technology.

The invention discloses a system and method for implementing services and service features of intelligent networks with user data transfer via a packet network, which avoids problems relating to unsupported parameter changes.

In one embodiment of the invention, resources are provided in an SCP (service control point) for the parameter changes to be made in the context of the services in respect of the signaling protocol used. For the implementation of a service, which requires a change to one or more protocol parameters in the signaling protocol, the parameter change is triggered by an SSP (service switching point) using INAP (intelligent network application part) procedures adapted for the transfer of parameters specific to the signaling protocol and the change to the protocol parameter(s) is effected in the SSP by the SCP. The SSP may in principle also be a CMN. As an example, the SCP is provided with resources in the form of a database and software, with which functions triggered by the SSP can be implemented. A parameter change can be triggered or initiated by the transfer of signaling data by the SSP to the SCP. The change may then depend on adjustable settings in the SCP, e.g. the PIN (Personal Identification Number) numbers. It may first be determined from the analysis of the signaling data transferred to the SCP whether and when which protocol parameters are changed in the SSP. The transferred signaling functions then on the one hand have the function of status data as input for the analysis in the SCP and on the other hand they initiate the analysis and then the parameter change indirectly by means of the result of the analysis.

The invention one advantage of allowing parameter changes which are not supported by the ISUP (ISDN user part), for example because of their relationship with the packet network.

In another embodiment of the invention, a protocol parameter can be changed while a connection is being set up. As part of the connection set-up process an IAM (initial address message) is transferred to the SSP. To implement the service using INAP messages and procedures adapted for the transfer of parameters specific to the signaling protocol, the SSP triggers the parameter change to be made in the SCP and the SCP transfers to the SSP as a minimum one information item relating to the protocol parameter change. The protocol parameter to be changed is then adapted using the information item and the IAM is forwarded. An APP (application transport parameter) included in the IAM can be used to adapt the IAM, with the change to be made being triggered in the SCP with the INAP procedures INITIAL DP and CONNECT adapted for the parameter change and being effected by the SCP in the SSP by changing the IAM APP. This means that parameters not supported by the ISUP can be changed, even when a connection is being set up. Two INAP procedures, which are adapted for the transfer of information elements corresponding to the parameter change, can be used for this.

In one aspect of the invention, A DP (detection point) can be set up in the SSP for parameter changes which are not made while a connection is being set up. A message sent in the context of a service, for which a parameter change is required, is detected at the DP. The INAP procedures EventReportBCSM and ContinueWithArgument adapted for the parameter change are used to trigger the parameter change to be made in the SCP and the parameter change is effected in the SCP. The use of a DP in conjunction with INAP procedures adapted for the transfer of information elements corresponding to the parameter change allows parameters to be changed at low cost, even outside the connection set-up phase.

In another aspect of the invention, a conventionally unsupported voice connection set-up, for example due to the packet network relationship with the address data to be transferred can be initiated by the SCP using an INAP procedure InitiateCallAttempt adapted for the transfer of the address data.

BRIEF DESCRIPTION OF THE DRAWINGS

The invention is illustrated below using a Figure in the context of an embodiment.

DETAILED DESCRIPTION OF THE PREFERRED EMBODIMENTS

Figure 1:
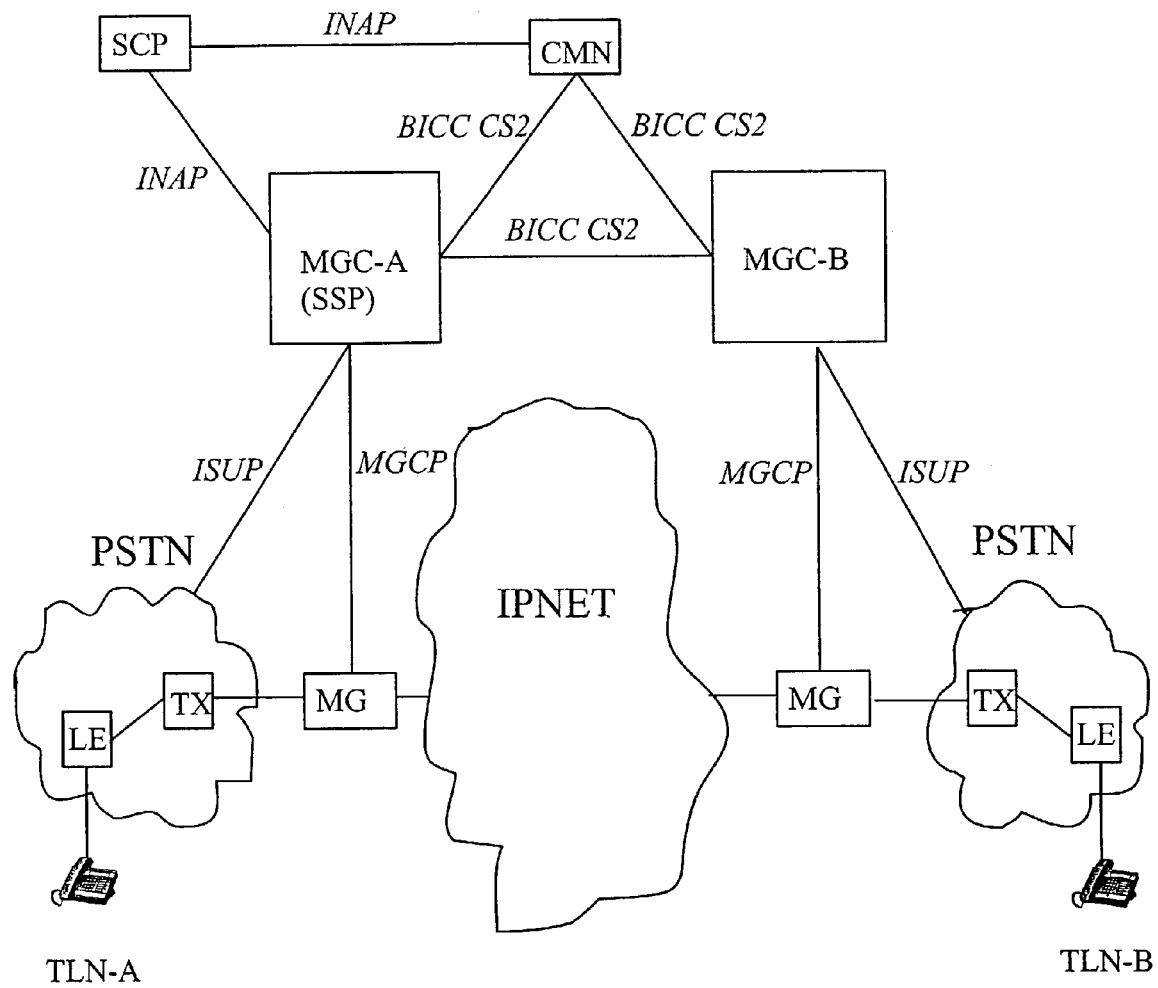
FIG. 1 shows a system for a call routed via a packet network.

FIG. 1 shows a system for a call routed via a packet network IPNET, for example an internet protocol based network. The terminals involved TLN-A and TLN-B are both connected to a PSTN network (public switched telephone network). Time multiplex technology—also abbreviated to TDM (time division multiplexing)—is generally used for PSTN networks, to combine data from different terminals or channels and transfer it via high-capacity lines—frequently referred to as trunk lines. For the embodiment it is assumed that the terminal TLN-A is the caller terminal and the terminal TLN-B is the recipient terminal. User data and control data are routed separately for the call, as shown for the SS#7 signaling system. User data is transferred from the terminal TLN-A to an end switching point LE near to the subscriber and from there to a transit switching point TX. The transit switching point TX is connected to a network access element MG (MG: Media Gateway), which is intended to process TDM user data for transfer via a packet network IPNET. User data transferred via the packet network IPNET in the context of a voice application is processed again on the recipient side by a network access element MG, to be then transferred first via a PSTN network to a transit switching point TX and finally to an end switching point LE, which is near to the subscriber, and to the subscriber terminal TLN-B. Signaling data for setting up a connection is however transferred to the control unit MGC-A (MGC: Media Gateway Controller), to which the A-side network access unit MG is assigned. To control connection set-up, the control unit MGC-A communicates with the A-side network access unit MG and the B-side control unit MGC-B. In the context of the IN concept, the control units correspond to a physical element of the switching level abbreviated to SSP (service switching point) in the introduction. This is shown in FIG. 1 by the abbreviation SSP in brackets.

Control functions of the IN, in one embodiment, are undertaken by an SCP. The reference characters for the protocols used for the exchange of signaling data are shown in italics in FIG. 1. Signaling data transferred via the PSTN networks to the control units MGC-A and MGC-B is transferred using the ISUP protocol. For the exchange of data between the control units MGC-A and MGC-B and the network access devices MG a media gateway control protocol MGCP is used and this may be adapted according to the manufacturer's specifications. Alternatively, communication between the control units MGC-A and MGC-B and the network access devices MG can also take place using the H.248 protocol. Signaling between the two control units MGC-A and MGC-B takes place using the BICC CS2 protocol. Alternatively an ISUP protocol ISUP+ adapted according to the manufacturer's specifications or the SIP-T (Session Initiation Protocol) may be used. The INAP protocol, extended as a result, is used for the exchange of signaling data between SSP and SCP.

Conventionally it is not possible to provide services and service features which require a change to packet network-relevant BICC CS2 parameters. Resources are supplied to the SCP for parameter changes, such as, for example, BICC-specific information elements. In the embodiment, resources to influence the information elements listed in the table below as a minimum are made available to the SCP. The information elements are described in more detail in the draft ITU standards Q.765.5 and Q.765.5 addendum (amendment). These information elements can also be analyzed along with other, perhaps already existing, elements and where appropriate can be changed by the SCP and/or be newly set up.

| Name of information element |
| --- |
| Application Transport Instruction Indicator (ATII) |
| Action Indicator |
| Backbone Network Connection Identifier |
| Interworking Function Address |
| Codec List |
| Single Codec |
| BAT Compatibility Report |
| Bearer Network Connection Characteristics |
| Bearer Control Information |
| Bearer Control Tunneling |
| Bearer Control Unit Identifier |
| Signal |
| Bearer Redirection Capability |
| Bearer Redirection Indicators |
| Signal Type |
| Duration |

The INAP procedures INITIAL DP, CONNECT, InitialteCallAttempt, EventReportBCSM and ContinueWithArgument—described in the ITU standard Q.1224—are extended to include the parameters corresponding to the information elements.

As described in Q.1901, working with Codec lists is an option when using BICC CS2. A parameter change according to the invention is illustrated below as an example using the information element Codec list. In the ITU documents Q.762 and Q.763 and the drafts of Q.763 (Addendum) and Q.765 it is pointed out that, with ISUP and ISUP-based BICC, connection set-up is initiated with a connection set-up message IAM (initial address message), which includes a parameter field APP (application transport parameter).

When connection set-up is initialized with an IAM, the Codec list constitutes an APP information element. According to the invention, information content is available in the SCP to influence or change the required Codec list. When the ISUP IAM reaches the control unit MGC-A, the INAP procedure INITIAL DP extended according to the invention is used, to signal to the SCP that connection set-up is required and the Codec list is available. Connection set-up is then continued by the SCP with the INAP procedure CONNECT adapted according to the invention and the information element(s) deemed to be significant by the SCP logic are forwarded. For example, the SCP may now have reduced the list of CODECs, so that not all of the original CODECs can be used for connection set-up. In the context of the IN concept, detection points can be set or defined at switching level for the exchange of control data between control and switching levels (see Q.1224). These detection points are abbreviated in IN terminology to DP. At a DP signaling data requiring an SCP-SSP interaction can be detected and an information exchange is initiated between SCP and SSP for connection control or service control. When DPs have been set, the INAP procedures EventReportBCSM (BCSM: Basic Call State Model) and ContinueWithArgument, extended according to the invention, can be used to initiate a necessary parameter change or adjustment in the SCP (Event ReportBCSM)and to transfer the required information element, for example a Codec list (ContineWithArgument). In order, for example, to be able to control alarm calls IN-specifically as well, InitiateCallAttempt is also extended appropriately. The procedure InitiateCallAttempt is used to transfer a control command from the SCF to an SSF to set up a call with a terminal, along with the terminal-specific address data. In order to be able to transfer packet network-specific address data, such as IP addresses for example, an extension according to the invention is required for InitiateCallAttempt.

As an option, the BICC protocol allows the use of physical elements for call adaptation, which use CMN (Call Mediation Node) to carry out the procedures for associated service switching points—referred to in the ITU standards as SN (service node) (see Q.1901 and for a summary of the IN-relevant terms Q.1290). Alternatively, the IAM APP can also be changed in a CMN (call mediation node) connected downstream from the control unit MGC-A and controlled by the SCP. With a connection set-up as shown in the Figure, the IAM would then be transferred from the control unit MGC-A to the CMN, changed there and forwarded to the MGC-B.

The invention can also be used in embodiments other than the one shown in the Figure. For example, SCP and SSP can be provided in the context of an arrangement, in which the corresponding functions are implemented by means of circuit logic and the device software. The term integrated service logic is frequently used by experts for this. Similarly the control units MGC-A and MGC-B can also be one and the same or the service switching point may supply the functions of the service switching point CMN in the same location as one of the control units MGC-A or MGC-B.

On the subscriber's side, instead of access via a PSTN network, what is known as a residential gateway, i.e. an access device in the subscriber's area of competence, can be used or a subscriber-side terminal can support voice-based packet network services (for example using the H.323 or SIP protocol).

What is claimed is:

1. A method for changing protocol parameters of a signaling protocol for implementation of services in an intelligent network with user data transferred via a packet network, comprising:
providing resources in a service control point for parameter changes to the services in the signaling protocol used; and
implementing a service, with which one or more protocol parameters are changed in the signaling protocol, the parameter change initiated by a service switching point using an intelligent network application protocol procedure adapted for a transfer of parameters specific to the signaling protocol, and the change to the protocol parameters is effected in the service switching point by the service control point, wherein the change to at least one protocol parameter is made during a connection set-up between a first terminal and a second terminal,
an initial address message comprising the at least one protocol parameter is transferred to the service switching point,
the parameter change is initiated by the service switching point and at least one information item is transferred by the service control point to the service switching point for the protocol parameter change for the implementation of the service using intelligent network application part procedures adapted for the transfer of parameters specific to the signaling protocol, and
the protocol parameter to be changed is adapted using the information item and the initial address message is forwarded.

2. The method according to claim 1, wherein functions of the service switching point are implemented in a call mediation node.

3. The method according to claim 1, wherein the parameter change is initiated by the service switching point by a transfer of one or more signaling information items to the service control point.

4. The method according to claim 1, wherein
an application transport parameter (APP) included in the initial address message is changed to adapt the initial address message,
the change is initiated in the service control point with an intelligent network application part procedure INITIAL DP adapted for the parameter change, and
an intelligent network application part procedure CONNECT adapted for the parameter change is used by the service control point to effect a change to the initial address message APP in the service switching point.

5. The method according to claim 4, wherein a detection point is provided to change protocol parameters in the service switching point.

6. The method according to claim 5, wherein a message, which is sent as a service for which a parameter change is required, is detected at the detection point,
the parameter change triggered using an intelligent network application procedure EventReportBCSM adapted for the parameter change to the service control point, and the parameter change is effected in the service switching point by the service control point using an intelligent network application procedure Continue WithArgument adapted for the parameter change.

7. The method according to claim 1, wherein address information is transferred by the service control point using an intelligent network application procedure InitiateCallAttempt adapted for the parameter change in the service switching point to set up a voice connection and initiate voice connection set-up.

8. The method according to claim 1, wherein a bearer independent call control protocol, a Session Initiation Protocol or an ISDN user part protocol adapted for the packet network transfer of user data is used as the signaling protocol.

9. The method according to claim 1, wherein the packet network is an internet protocol-based or asynchronous transfer mode technology-based network.

10. The method according to claim 1, wherein resources to influence at least one of BICC-specific information elements are supplied in the service control point comprising at least one of an Application Transport Instruction Indicator (ATII), Action Indicator Backbone Network Connection Identifier, Interworking Function Address, Codec List, Single Codec, BAT Compatibility Report, Bearer Network Connection Characteristics, Bearer Control Information, Bearer Control Tunneling, Bearer Control Unit Identifier, Signal, Bearer Redirection Capability, Bearer Redirection Indicators, Signal Type and Duration.

11. The method according to claim 10, wherein at least one of the intelligent network application procedures INITIAL DP, CONNECT, InitiateCall Attempt, EventReport-BCSM and ContinueWithArgument is adapted to change at least one of the information items.

12. The method according to claim 1, wherein the functions of service switching point and the service control point are implemented in one physical unit.

* * * * *